United States Patent [19]
Steinz et al.

[11] Patent Number: 5,822,514
[45] Date of Patent: Oct. 13, 1998

[54] METHOD AND DEVICE FOR PROCESSING SIGNALS IN A PROTECTION SYSTEM

[75] Inventors: Hendrik Christian Steinz, Hattem; Johannes Roland Dassel, Almere, both of Netherlands

[73] Assignee: NV GTI Holding, AJ Bunnik, Netherlands

[21] Appl. No.: 676,194
[22] PCT Filed: Oct. 16, 1995
[86] PCT No.: PCT/NL95/00354
  § 371 Date: Jul. 17, 1996
  § 102(e) Date: Jul. 17, 1996
[87] PCT Pub. No.: WO96/16369
  PCT Pub. Date: May 30, 1996

[30] Foreign Application Priority Data

Nov. 17, 1994 [NL] Netherlands ............................. 9401923

[51] Int. Cl.⁶ .............................. G06F 11/00; G06F 11/16
[52] U.S. Cl. ........................................ 395/185.02; 371/70
[58] Field of Search ........................ 395/185.02, 185.06, 395/185.04, 184.01, 561, 564, 583, 849; 371/67.1, 70

[56] References Cited

U.S. PATENT DOCUMENTS

| | | | |
|---|---|---|---|
| 3,174,133 | 3/1965 | Kunzman et al. | 371/70 |
| 3,340,506 | 9/1967 | Mayer | 371/70 |
| 3,618,020 | 11/1971 | Parker | 371/70 |
| 3,719,816 | 3/1973 | Darmon et al. | 371/70 |
| 4,166,272 | 8/1979 | Deck | 371/70 |
| 4,302,841 | 11/1981 | McCulloch | 371/70 |
| 4,584,666 | 4/1986 | Zolnowsky et al. | 395/185.06 |
| 4,740,972 | 4/1988 | Rutherford, Jr. | 371/70 |
| 4,785,453 | 11/1988 | Chandran et al. | 371/70 |
| 5,179,689 | 1/1993 | Leach et al. | 395/425 |
| 5,327,543 | 7/1994 | Miura et al. | 395/375 |
| 5,535,417 | 7/1996 | Baji et al. | 395/842 |

Primary Examiner—Joseph Palys
Attorney, Agent, or Firm—Jones, Day, Reavis & Pogue

[57] ABSTRACT

A method and system for processing signals in a protection system involves executing operations on signals that are complimentary to each other, such that the results of the operations determines whether the operations can be continued. Logic operations are performed and controlled variables, and complimentary operations are performed and controlled by state machines which trigger one another, to configure the system as a "house of cards" architecture, such that the entire correct functioning of the system of cooperating state machines is disabled when something goes wrong with one of the state machines. The complimentary operations executed are logic transformations, belonging to the class of LAOS/LOAS transformation, and each time one logic transformation is executed on logic variables during one operation, the logic operations complimentary to the transformation is executed on the inverted variables during the other operation, in order that the operating result in the cycles is the inverse of the corresponding other operating result in the cycles.

11 Claims, 3 Drawing Sheets

METHOD AND DEVICE FOR PROCESSING SIGNALS IN A PROTECTION SYSTEM

This application is a 371 of PCT/NL95/00354 filed Oct. 16, 1995.

The present invention relates to a method for processing signals in a protection system.

The invention furthermore relates to a device for carrying out said method.

In the known protection systems a certain amount of input signals, in particular the course of time of pulsed input signals, is usually monitored by means of protection circuits or security circuits, the output signals of which are in turn also monitored. Usually the signals to be monitored exhibit a certain dynamic (time behaviour) and the protection circuits do not have to take action until the moment that the behaviour, in particular the time behaviour, of the signals to be monitored has changed. When an output signal level remains constant, for example because of the occurrence of a system error in the protection system, and cannot even be changed, this (stuck at) error will not be detected until changes are purposefully made on the input of the protection system as a check.

In addition it is not possible to establish the occurrence of such a function allocation error on for example both input signals being logical one, when an "OR" function is erroneously carried out instead of an "AND" function, until the moment that one of the signal levels of said input signals is changed. There is a very real possibility of such an error occurring when a protection system is required to be programmable in order to enhance its flexibility and usability.

Under certain circumstances the occurrence of an unsafe situation, even if this is caused by a complex of, possibly simultaneously occurring, errors, is not detected by means of a so-called "voter circuit", which decides whether an unsafe situation has occurred on the basis of a majority decision of the signal levels of the signals to be monitored.

It will be apparent that the non-detection of potentially dangerous error situations which may occur in protection systems is undesirable.

Consequently the object of the present invention is to provide a method and a device for processing signals in a protection system, which not only makes it possible to monitor the signal levels of the input signals as well as their timing, but which in addition to that is capable of detecting errors occurring in the device itself which cannot be directly detected at the output thereof, and to make said errors detectable in a manner whereby the system itself, in spite of the error that is occurring, is put in a safe condition.

In order to accomplish that objective the invention comprises the features defined in claim 1.

The advantage of the method according to the invention is that the execution of complementary operations makes it possible to relate the result of said operations unequivocally to each other, so that, for example when the (interim) results of the operations are the inverse of each other, the results related to each other provide information with regard to the correct functioning of the protection system in a simple manner. At the same time said (interim) results, which are of importance for the protective function when using the method according to the invention, can be used for executing the operations on the input signals in order to obtain output signals, which thus automatically comply with very strict safety and reliability requirements. Advantageous is furthermore the fact that the occurrence of an error situation can be detected without running the risk that the processing of the signals will introduce errors which remain unnoticed for a sufficiently long period to be of importance to safety.

One embodiment of the method according to the invention comprises the feature defined in claim 2.

The advantage of the embodiment according to the invention is that the possible occurrence of an error is established within a (usually short) period, and that corrective measures can be taken at once, if desired.

Another embodiment of the method according to claim 3 has the advantage that if the (interim) results of the complementary operations do not correspond in the prescribed manner, no further operations will take place, thus providing a simple checking and detection possibility with regard to the correct functioning of a protection system.

By forming a system of state machines in accordance with claim 4, which state machines of necessity trigger one other, a "house of cards"-like construction is realized, as a result of which the entire correct functioning of the system of cooperating state machines is disabled when something goes wrong in one of said state machines. The correct functioning of the system is namely conditional upon the various state machines triggering one another. This dynamic principle ensures a simple detection of any error conditions that may occur, whereby the system will moreover go to a predetermined safe state upon detection, because the state machines will become inoperable.

According to the invention a high degree of flexibility of parallel or serial operating cycles will be achieved by implementing the feature defined in claim 5.

According to the feature defined in claim 6 the complementary operations can be implemented in a simple manner by means of logic transformations, such as (N)AND, (N)OR or inversion operations.

Yet another embodiment of the method according to the invention is set forth claim 7, which method leads to (interim) results which are inversely related to each other at any corresponding point of time.

Embodiments of devices according to the invention to be digitally implemented in a simple manner are defined in the further claims relating to the device.

The method and the device for carrying out said method as well as the advantages thereof will be explained in more detail hereafter with reference to the accompanying drawing. In the drawing.

Figure 1:
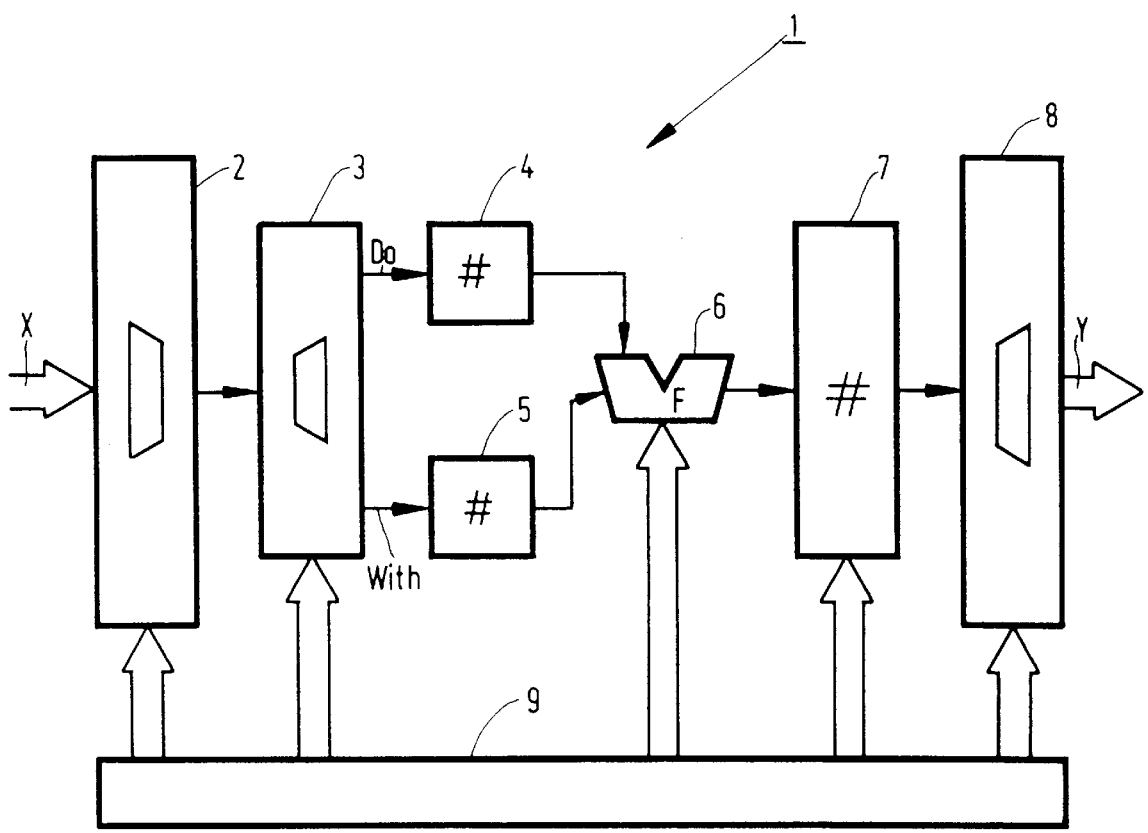
FIG. 1 shows a block diagram representing a schematic embodiment of a device according to the invention to be used in a protection system.
Figure 3:
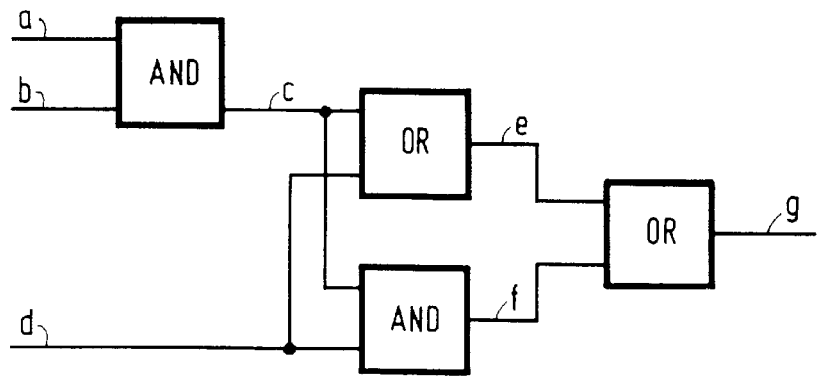
Figure 4:
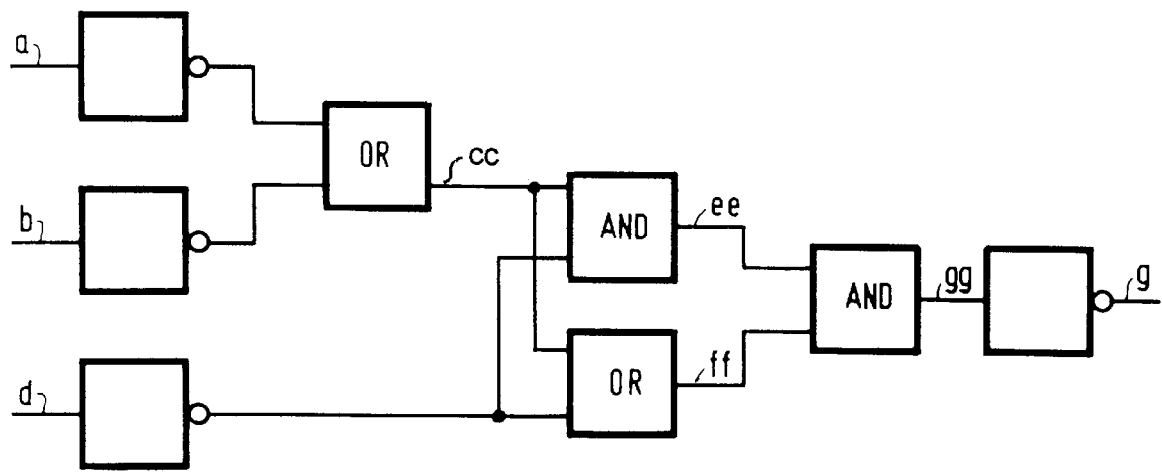
Figure 5:
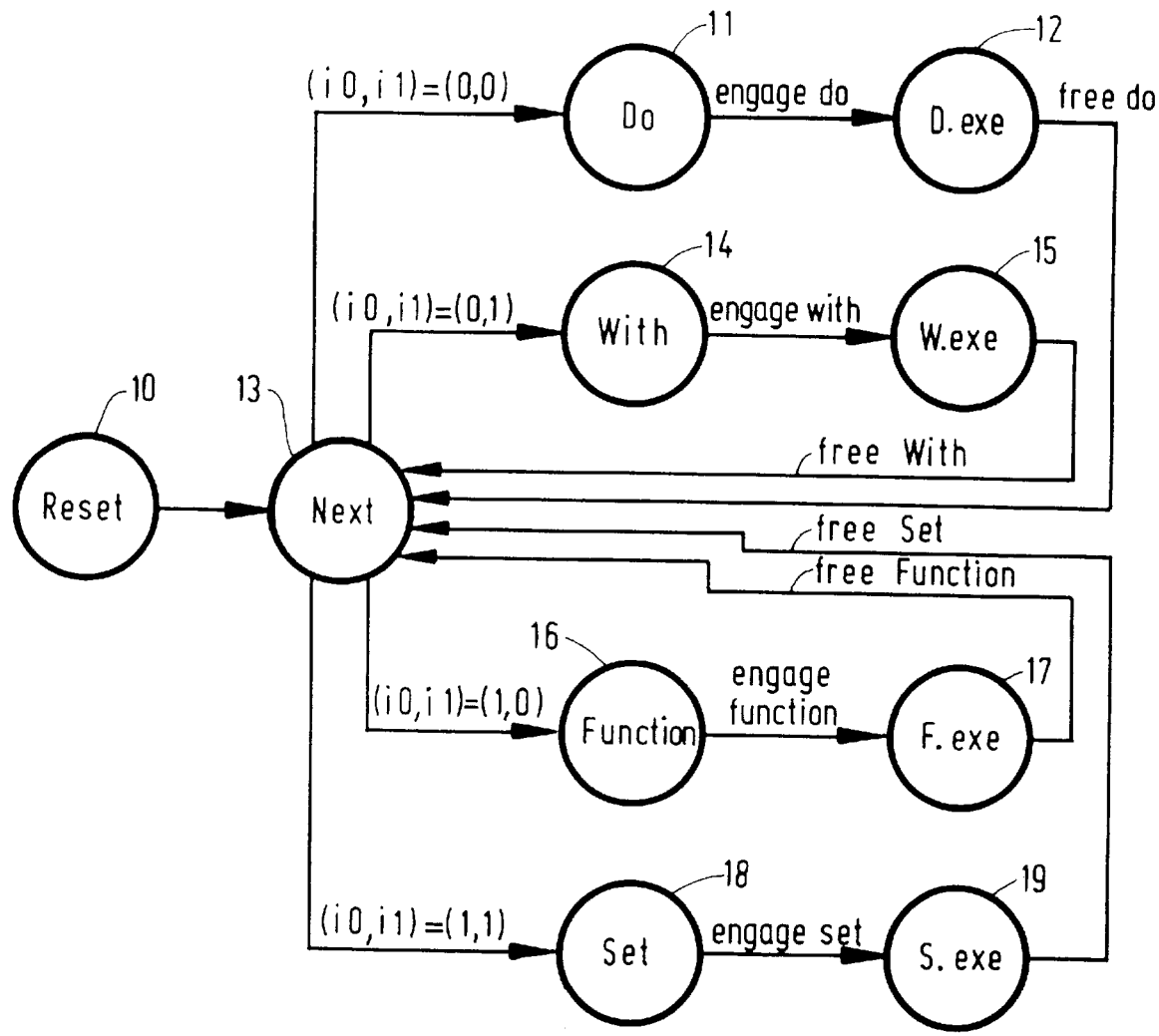
Figure 6:
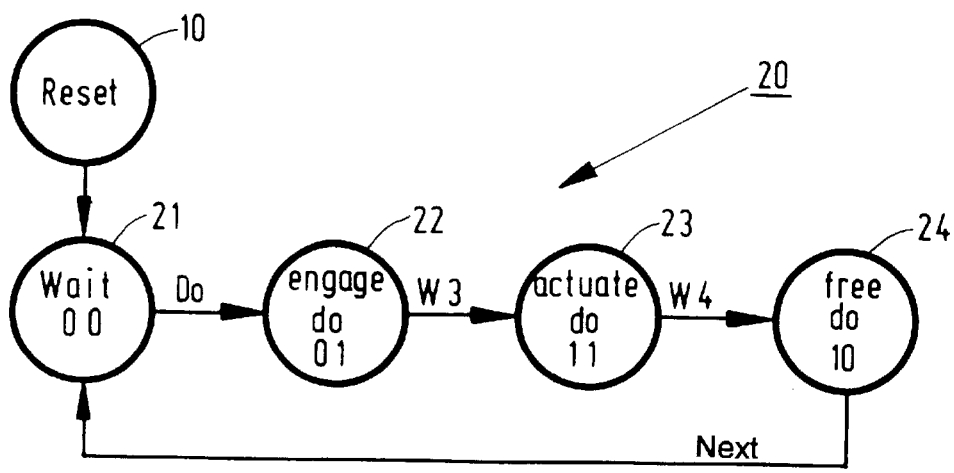

FIGS. 3 and 4 each show a hardware implementation of a possible complementary logic transformation to be used in the device of FIG. 1; and FIGS. 5 and 6 are schematic illustrations of a possible instruction flow diagram for implementing the method according to the invention.

FIG. 1 shows a schematic embodiment of a device 1, which forms part of a protection system. Input signals X are supplied to the device 1, which, after being processed in the device 1, are delivered in the form of output signals Y. The requirement that is made of the device 1 is that it must comply with very strict safety and reliability requirements. The input signals X originate from signals written in magnetic cores and read therefrom, whilst the output signals Y in turn magnetize magnetic cores, whereby the magnetic cores return to their initial magnetization condition. In this manner a multitude of errors in the output signals Y can be detected by means of a voter circuit. The signals X and Y are repetitive signals, so that a return to the initial condition is made after every lapse of a period of for example 1 millisecond.

Logic transformations are executed on the input signals X by means of the device 1, in a manner which minimizes the possibility of the device 1 itself introducing errors into the output signals Y. For that purpose the device 1 contains input storages, which are addressable storages in the illustrated embodiment, to which input signals X are supplied, which input storages are built up of an input signal selector 2 and an instruction selector 3 connected in series therewith. The instruction selector 3 selects one of two temporary storages 4 and 5, namely the "Do" clipboard 4 or the "With" clipboard 5. The instruction selector 3 is connected to a function selector 6 via the clipboards 4 and 5. Addressable output storages in the form of register means 7 and an output selector 8 connected to the register means 7 are connected to the function selector 6. The Figure schematically indicates in part that each of the aforesaid components 2–8 of the device are connected to (schematically indicated) instruction management means 9.

The instruction management means 9 supply the control signals to the aforesaid components 2–8 that are necessary to execute the required operations on the input signals X. The management means 9 control the driving sequence and method, in order to enable the device 1 to execute the required logic transformations. During each cycle of a number of parallel or serial cycles a number of logic transformations are executed, whilst the logic transformations that are complementary thereto are executed in a second cycle. Based on a period of 1 millisecond, one set of operations is executed during the first $500\mu$ sec of the first cycle, and the set of complementary operations on the input signals X is executed during the subsequent serial cycle of $500\mu$ sec. After comparing the results of the operations (which must be the inverse of each other or be identical to each other) an insight is gained with regard to an unsafe situation in the signal levels and/or the timing of the input signals X, or with regard to errors introduced by the device 1.

The type of complementary operations referred to are those logic transformations which for example have as a result that the signals are identical to each other after the logic transformations have been executed (possibly inclusive of inversion). This principle may for example be based on the well-known de Morgan theorem. For example, if an EN transformation is executed on signals a and b, the complementary logic transformation executed in the form of an OR operation on the inverse of said signals will result in an output signal which is exactly the inverse of the output signal produced by the aforesaid AND operation and which, after inversion, is thus identical thereto. In other words, the AND operation on signals a and b may be considered to be substituted by an OR operation on signals a inverse and b inverse, whereby the output signal of the OR operation results in the original signal ab after inversion. The same principle may be used if cascade connections based on this principle are used.

A complementary transformation which is of relevance for the present embodiment will hereafter be called the LAOS-LOAS transformation. The hardware implementation of said transformation is explained in FIG. 3 (LAOS transformation) and FIG. 4 (LOAS transformation). In the truth table below it is made apparent in a simple manner that each of the signals c-cc, e-ee, f-ff, g-gg are the inverse of each other.

TABLE

| a | b | d | c | cc | e | ee | f | ff | g | gg |
|---|---|---|---|----|---|----|---|----|---|----|
| 0 | 0 | 0 | 0 | 1  | 0 | 1  | 0 | 1  | 0 | 1  |
| 0 | 0 | 1 | 0 | 1  | 1 | 0  | 0 | 1  | 1 | 0  |
| 0 | 1 | 0 | 0 | 1  | 0 | 1  | 0 | 1  | 0 | 1  |
| 0 | 1 | 1 | 0 | 1  | 1 | 0  | 0 | 1  | 1 | 0  |
| 1 | 0 | 0 | 0 | 1  | 0 | 1  | 0 | 1  | 0 | 1  |
| 1 | 0 | 1 | 0 | 1  | 1 | 0  | 0 | 1  | 1 | 0  |
| 1 | 1 | 0 | 1 | 0  | 1 | 0  | 0 | 1  | 1 | 0  |
| 1 | 1 | 1 | 1 | 0  | 1 | 0  | 1 | 0  | 1 | 0  |

The instruction implementation of the LAOS-LOAS transformation may take place in accordance with the following codes corresponding with each other:

| LAOS code | | LOAS code | |
|---|---|---|---|
| Do   | a  | Do   | a  |
| With | b  | With | b  |
| AND  | R1 | OR   | R1 |
| Do   | R1 | Do   | R1 |
| With | d  | With | d  |
| OR   | R2 | AND  | R2 |
| Do   | R1 | Do   | R1 |
| AND  | R0 | OR   | R0 |
| Do   | R0 | Do   | R0 |
| With | R2 | With | R2 |
| OR   | R0 | NAND | R0 |
| Set  | g  | Set  | g  |

LAOS and LOAS stand for Load (for example "Do" or "With") AND, OR and SET and LOAS, OR AND SET respectively. If desired the logic functions NAND and NOR may be implemented. With these functions also signal inversions can be implemented. The aforesaid LOAS/LAOS codes even have a one-to-one absolute and relative relation with regard to their code rules.

Figure 2:
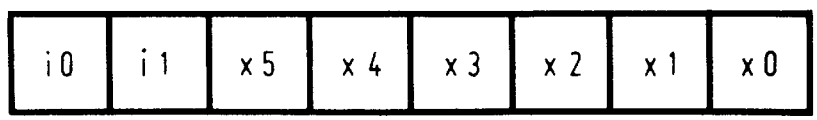
FIG. 2 shows the possible format of an instruction code to be used in the device of FIG. 1.

As already said before, the control of the actual execution of the LAOS and LOAS codes on the input signals X takes place by means of the instruction management means 9. The format in which the various logic operations are executed on the input signals X is schematically illustrated in FIG. 2. The bits x0–x5 shown therein are the address signals, by means of which the 64 input signals are selected in the input signal selector 2 in the illustrated preferred embodiment, whilst bits i0 and i1 indicate the instructions which are actually to be executed. The instructions may for example be a "Do" action in clipboard 4 in case i0,i1=0,0; if i0,i1=0,1 the "With" operation will take place in clipboard 5; if i0,i1=1,1 the Set operation will take place for the output signal selector 8, while a logic function is executed on the signals emanating from the clipboards 4 and 5 if i0,i1=1,0, while also the register means 7 are addressed in that case. If necessary interim results which are necessary to execute the logic transformations, which interim results are written to the register means 7 in the code table, are returned to the input signal selector 2 from the internal register means 7.

In the present embodiment the LAOS code is executed on the input signals (a, b and d; see FIG. 3) during the first cycle, while the complementary LOAS code is executed on the inverse of the input signals (a, b and d; see FIG. 4) during the second part of the period of the input signals.

The advantage of the complementary logic LAOS/LOAS transformation is that each corresponding rule in the various codes produces a result which is complementary to the other result, while in addition to that the codes are built up in such a manner that, in real time, they have a corresponding relation. Put differently, complementary operations take place at any corresponding moment during the execution of the codes, while furthermore the number of code rules and the length of the codes are identical. This preferred implementation of the two codes may be dynamically implemented by using state machines which trigger each other in succession. The implementation by means of state machines results in a "house of cards"-like construction, wherein the mutual relations are such that if one card is removed, the whole construction will collapse and an error situation will thus be detected. Put in terms of state machines, it is aimed at to configure the various functionalities in the device 1 in such a manner, that a system which is connected in time is obtained, wherein the absence of one link or the poor functioning thereof will already suffice to affect the function of the device 1 as a whole, in order to indicate that an error situation has occurred in the various state machines and circuits of the device 1.

The dynamic functional design of the state machine for the execution of the instruction shown in FIG. 2 is schematically shown in FIG. 5.

Based on a LAOS transformation to be executed on input signals x0 ... x5 during the first cycle, the next instruction having the format shown in FIG. 2 is called at 13, after a reset signal has been given for that purpose, whereby, if i0,i1=0,0, the upper branch is passed through, in which the instruction is decoded after being retrieved and a shift to status 11 ("Do") is made on the next clock pulse. For the "D.exe" state machine 20 shown in FIG. 6 the commencement of status 11 is the time to shift from status 21 to status 22 (the "engage do" status) upon the next clock pulse. State machine 20 is in status 22 and this status is only changed if an error detection state machine (not shown) gets into a W3 status. Only then is the remaining part of the present instruction completed at status 23 ("actuate do"), because the associated input signal x0 ... x5 is stored in clipboard 5. A next signal W4 of the error detection state machine shifts device 20 to status 24, as a result of which a shift from status 12 to status 13 is made in FIG. 5 and from status 24 to status 21 in FIG. 6. From the foregoing it becomes apparent that the instruction, the "Do" instruction in this case, is split up in parts, two in this case, whereby the first part is executed by one state machine and the other part is executed by the other state machine, and whereby the two state machines trigger one another. When at least one of the two state machines becomes temporarily inoperable, this will result in the instruction not being executed correctly and completely, which manifests itself in a lack of mutual communication, which will cause the system to stop.

That which has been explained above with regard to the "Do" and "D.exe" statuses and the associated state machine 20 correspondingly applies to the status pairs 14,15 and 16,17 and 18,19 and the state machines (not shown) associated with each of said pairs, in which also the split-up parts of the respective instructions of the LAOS/LOAS code are respectively executed by the state machines triggering each other.

Each input signal is subjected to the LAOS code in the above-described manner, and during the second cycle the complementary logic transformation in the LOAS code is executed on the input signals, whereby contiguous thereto the further safety information desired becomes available on the basis of a comparison of the corresponding signals made in comparing means (not shown). In case one of the state machines should "be stuck" and deliver a signal which is constant in time, for example because it is not functioning properly, if at all, the execution of the code sequence is stopped and it can only be started again by means of a Reset pulse to be input explicitly. In this manner it is indicated explicitly that the device 1 is poorly functioning internally.

What is claimed is:

1. A method for processing signals in a protection system comprising the steps of:

executing complementary logic transformed operations on the signals;

splitting said logic transformed operations in parts;

executing each part of the logic transformation separately with state machines triggering one another;

detecting interim results of the logic transformed operations; and causing the operations to stop in a safe manner upon detection of an error occurring in the interim results.

2. A method according to claim 1 wherein said signals have a cyclic time duration within which said complementary operations are to be executed.

3. A method according to claim 2 wherein each time one logic transformation is executed on logic variables during one operation, the logic operation complementary to said one transformation is executed on inverted variables during the other operation, in order that one operating result in the cyclic time duration is the inverse of a corresponding other operating result in said cyclic time duration.

4. A method according to claim 1 wherein said complementary operations can continue to be executed only if no error occurs in the interim results.

5. A method according to claim 3 wherein said interim results are achieved by state machines triggering one another.

6. A method according to claim 1 wherein said operations are executed in parallel and/or serial cycles.

7. A method according to claim 1 wherein said logic transformations belong to the class of LAOS/LOAS transformation.

8. A device for processing signals in a protection system comprising:

addressable input storages including an input signal selector and an instruction selector connected to said input signal selector;

temporary storages connected to said addressable input storages;

a function selector connected to said temporary storages;

addressable output storages connected to said function selector; and instruction management means connected to each of said storages and to said function selector.

9. A device according to claim 8 wherein said addressable output storages include register means and an output signal selector connected to said register means.

10. A device according to claim 9 wherein said instruction management means and/or said temporary storages are provided with state machines.

11. A device according to claim 10 wherein said state machines are interconnected in such manner as to trigger one another.

* * * * *